United States Patent [19]

Stavis et al.

[11] 3,773,422
[45] Nov. 20, 1973

[54] CALCULATING LINEAR DIMENSIONS FROM TV IMAGES

[75] Inventors: Gus Stavis, Croton on Hudson; Robert A. Flower, White Plains; Donald Z. Blau, City Island, all of N.Y.

[73] Assignee: The Singer Company, New York, N.Y.

[22] Filed: Apr. 7, 1971

[21] Appl. No.: 131,974

[52] U.S. Cl. ............... 356/156, 356/1, 356/159, 356/164, 356/167
[51] Int. Cl. ............................................. G01b 11/00
[58] Field of Search ............... 356/1, 120, 156, 356/159, 162, 164–167, 171; 250/219 WD, 219 LG, 219 TH

[56] References Cited
UNITED STATES PATENTS

| 3,590,258 | 6/1971 | Shibota et al. | 356/120 |
| 3,610,754 | 10/1971 | Pirlet | 356/1 |
| 3,625,618 | 12/1971 | Bickel | 356/120 |

*Primary Examiner*—David Schonberg
*Assistant Examiner*—F. L. Evans
*Attorney*—Andrew L. Bain, William Grobman and Charles S. McGuire

[57] ABSTRACT

A video mensuration system wherein actual linear dimensions of objects may be calculated from the dimensions of video images of the objects without direct measurement of the camera to object distance. A beam of light is projected in a thin sheet to intersect the object across the dimension to be measured. The intersection appears as a line on the TV image and the actual dimension may be calculated from other known distances and geometric relationships.

6 Claims, 4 Drawing Figures

CALCULATING LINEAR DIMENSIONS FROM TV IMAGES

This invention relates to linear measuring in general and more particularly to apparatus for measuring utilizing a television camera.

In certain applications it is advantageous to use a TV camera for measuring linear dimensions. For example, in a rolling mill a camera may be set up to view the edge of the metal sheet or plate being rolled and the resulting video information (image size) used to measure thickness. The camera to object plane distance must be known in such systems because of the fundamental lens equation in which the image size will be inversely proportional to the object plane distance. If plates of different widths are rolled, or distance from the camera to the edge otherwise varies, present systems of this nature have a major disadvantage in that measurements must be made or the camera moved. Obviously this can be time consuming and dangerous in an operating rolling mill.

The present invention obviates the aforementioned disadvantages by utilizing a thin beam or sheet of light, preferably from a monochromatic source such as a laser, which intersects the object along the dimension to be measured. That is, the intersection of the light with the object forms, in effect, a line whose ends define the dimension to be measured, whereby the object plane is defined by the position of the line. Since the position of the TV camera, angle and relative position of the intersection of the camera optical axis with the light beam are known, the dimension to be measured may be calculated from a measurement of the TV image of the line without direct measurement of the camera to object plane distance as the object itself moves relative to the camera lens.

In the case of measuring plate edge thickness, the light beam is arranged to intersect the edge perpendicularly to the longitudinal dimension thereof, whereby the distance between the ends of the line formed by the intersection corresponds to the thickness of the plate. The camera optical axis is arranged to intersect the beam at a known angle and a known distance from the camera lens. For ease of calculation, as will later become apparent, it is preferred that the optical axis be normal to either the plane of the plate edge or normal to the plane of the beam. In any case, however, the established geometric relationships allow computation of actual plate thickness from the video image of the beam intersection with the plate edge without directly measuring the distance from the camera to the plate edge.

It is a principal object of this invention to provide an improved system for making measurement of linear dimensions of an object using a television camera.

It is a further object to provide such a system which will provide convenient means for determining camera to object plane distance without direct measurement.

Another object is to provide a system which will maintain camera lens to object plane distance constant irrespective of movement of the object being measured.

It is another object to provide such a system which is particularly useful in measuring the thickness of a plate being rolled in a rolling mill.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure and the scope of the invention will be indicated in the claims.

For a fuller understanding of the nature and objects of the invention reference should be had to the following detailed description taken in connection with the accompanying drawings, in which.

Figure 1:
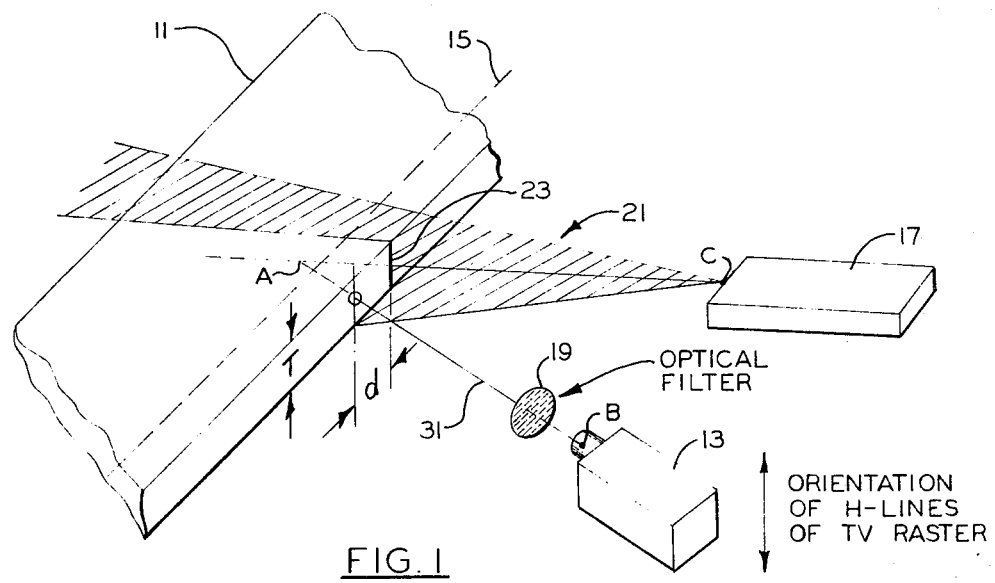
FIG. 1 is a perspective view of a first embodiment of the invention.

FIG. 1 shows a plate 11 such as might be found in process in a rolling mill. The edge of the plate is viewed by camera 13 with the optical axis of camera 13 in this case normal to the edge of plate 11. With only these two elements present the thickness $T$ of the plate can be found by the equation:

$T = (p/q) T_i$ where $T_i =$ the thickness as imaged on the TV camera
$T =$ real plate thickness
$p =$ the lens to object plane (plate edge) distance measured along the optical axis
$q =$ the lens to image plane distance The value of q is a known attribute of the camera, but the lens to object plane distance must be known or determined to use the equation. For example, if the next plate had its edge located as indicated by dotted line 15 a new distance measurement ($p$) would have to be made. As previously mentioned, such operations can be inconvenient, time consuming and dangerous.

Figure 2:
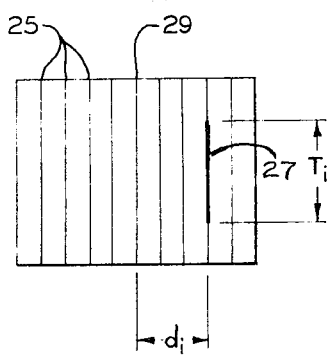
FIG. 2 is a view of the image resulting from the embodiment of FIG. 1.

The embodiment of FIG. 1 solves this problem by utilizing a beam from a light source, preferably a monochromatic source such as laser 17. The laser 17 is arranged to provide a thin vertical sheet of light 21 which will intersect the edge of plate 11 to form a line 23 perpendicular to the longitudinal plate edge. Optical filter 19 is placed in the viewing path of camera 13 and is selected to pass only light having a wave length corresponding to that emitted by laser 17. This will cause only the sharp line 23 of the intersection to appear on the camera tube, facilitating more accurate measurement. TV camera 13 is preferably rotated so that its fast scan is parallel to line 23. The resulting image on camera 13 will be shown on FIG. 2.

The scan lines 25 are vertical and on one of them an image 27 of line 23 will appear. A line 29 corresponding to the position on the scan of the optical axis of the camera will be known (i.e., the center line). Thus, a distance $d_i$ from the center line to the image of the line may be found simply by counting lines.

Also known is the location of point A where laser beam 21 and the optical axis 31 of the camera intersect. The distance $AB$ from point A to the lens of camera 13 is known, as is AC the distance from point A to point C, the point where a line from point B perpendicular to the optical axis intersects beam 21. Also known is $BC$, the distance between points B and C. Then by similar triangles:

$$AB/BC = (AB - p)/d \quad (2)$$

where $d$ is the distance between line 23 and the intersection of optical axis 31 with plate 11. Solving for $d$:

$$d = (AB-p)(BC)/AB \quad (3)$$

Since neither $d$ nor $p$ is known at this point it is necessary to express one in terms of the other. This may be accomplished by reverting to equation (1) and substituting $d$ and $d_i$ for $T$ and $T_i$, respectively, which is valid since the actual dimensions $d$ and $T$ are in the same relationship to one another as the images of these dimensions. Thus:

$$d = (p/q) d_i \quad (4)$$

Taking the two equalities of d from equations (3) and (4) and solving for $p$ gives:

$$p = q(AB)(BC)/d_i(AB) + q(BC) \quad (5)$$

Since all these quantities are known, $p$ may be determined without direct measurement and $T$ may be calculated from equation (1) simply by measuring $T_i$ on the video display.

Figure 3:
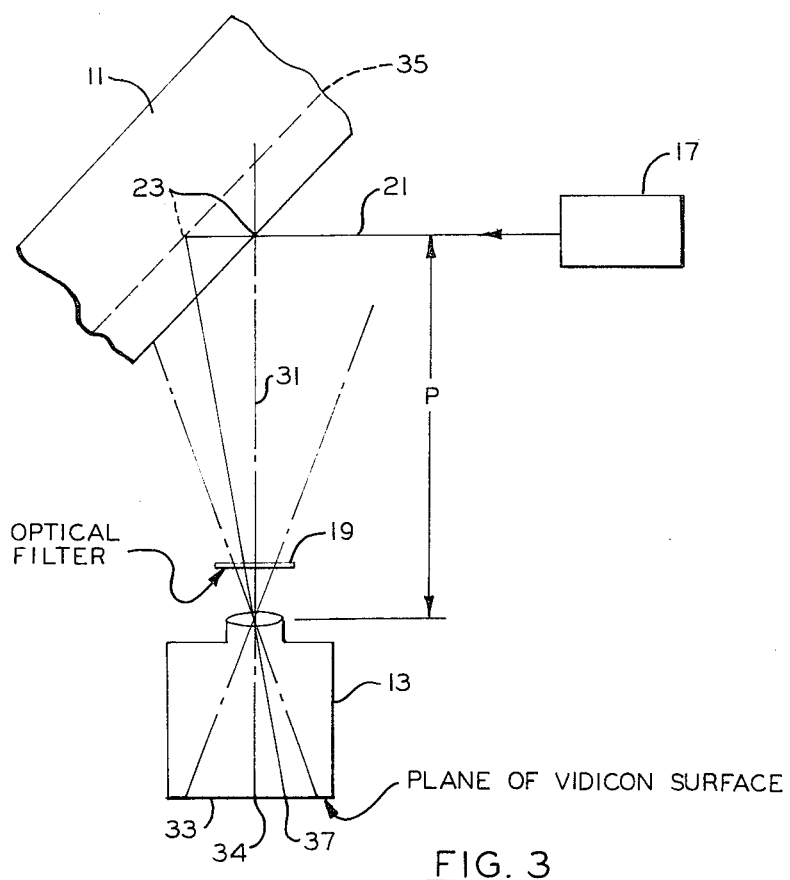
FIG. 3 is a plan view of a second embodiment of the invention.
Figure 4:
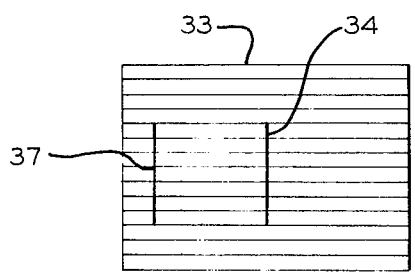
FIG. 4 is a view of the image resulting from the embodiment of FIG. 3.

In FIGS. 3 and 4 a second embodiment of the invention is shown. Instead of optical axis 31 being normal to the edge of plate 11, it is normal to the plane of beam 21. In other words, beam 21 is parallel to the vidicon surface of camera 13, and the distance along optical axis 31 from the lens to the plane of the beam is constant. Since line 23, the intersection of beam 21 with the edge of plate 11, will always be in this plane irrespective of the lateral position of the edge, the plane of beam 21 will be the object plane and $p$ will be constant. With plate 11 in the position shown in solid lines in FIG. 3 the image of line 23 would lie at the center of the vidicon surface 33, as indicated at 35. If the plate edge was located in the position indicated by dotted line 35 the image would be in the position indicated in FIG. 3 and 4 by reference numeral 37. Lines 34 and 37 would be the same length for the same plate thickness since the line 23 being imaged would lie in the same object plane.

In the second embodiment, since $p$ is a known constant there is no need to measure $d_i$, as in the first embodiment. Thus, there is no advantage in making the horizontal scan lines parallel with the image of the beam - plate intersection. The image may be transverse to the horizontal scan lines, as lines 34 and 37 are shown in FIG. 4, and $T_i$ measured by counting lines. It is then a simple matter to calculate $T$ from the known values $p$, $q$ and $T_i$.

The foregoing disclosure has provided examples of linear dimension measuring from TV images which is faster, easier and safer than prior comparable means. Although measurement of plate thickness in a rolling mill has been used as an example, the invention will also be useful in other areas of application where it is difficult to make actual measurements of the object or of the camera to object distance because of movement, heat, radiation, etc. While the two disclosed embodiments were actually special cases of the general mathematical principles used in the invention (i.e., the optical axis is normal to the plane of the object in one, and the plane of the beam in the other) it is evident that trigonometric functions could be employed to obtain the unknown values with the optical axis in other orientations. It is necessary only that the distance from the camera lens along the optical axis to its intersection with the beam and the angle of intersection of the optical axis and beam be known. Finally, it should be noted that the straight line distance between the ends of the line formed by the beam-plate edge intersection in the illustrated examples defines the plate thickness. Thus, it is not essential that the edge be essentially flat, or planar, as illustrated.

What is claimed is:

1. A method of calculating the linear distance between two points on a surface of an object from a TV image thereof when the TV camera lens to object plane distance is unknown, said method comprising the steps of:
   a. fixedly arranging a light source to project a beam from an emission point essentially in a plane transverse to and intersected by the two points between which the distance is to be calculated;
   b. fixedly arranging a TV camera to view the intersection of the beam and object, with the camera optical axis at an angle to the beam, and the camera scan lines parallel to the image of the beam-object intersection;
   c. measuring the distance ($AB$) along the camera optical axis from the lens to the point of intersection of the axis and the beam;
   d. measuring the distance ($BC$) from the camera lens to the emission point;
   e. measuring the distance ($d_i$) from the camera image centerline to the camera image of the intersection of the beam and object;
   f. measuring the length ($T_i$) of the camera image of the intersection of the beam and object between the two points; and
   g. calculating the linear distance ($T$) between the two points as follows:
   $T = T_i(AB)(BC)/d_i(AB) + q(BC)$
   where $q$ is the camera lens to image plane distance.

2. The invention according to claim 1 including the step of using a laser as the light source.

3. The invention according to claim 1 including the step of positioning the camera with its optical axis normal to the surface of the object on which the two points lie.

4. A method of calculating the linear distance between two points on a surface from a TV image of a beam of light projected essentially in a plane to intersect the surface and extend linearly between the two points, said method comprising the steps of:
   a. arranging a TV camera having a lens with its vidicon surface parallel to the plane of the light beam;
   b. measuring the distance ($p$) along the camera optical axis from the lens to the point of intersection of the axis and the beam;
   c. measuring the length ($T_i$) of the image of the beam between the two points; and
   d. calculating the linear distance ($T$) between the two points as follows:
   $T = (p/q) T_i$
   where $q$ is the camera lens to image plane distance.

5. The invention according to claim 4 including the step of projecting the beam from a monochromatic source.

6. The invention according to claim 5 and further including the step of interposing between the camera lens and the beam a filter which passes only light of the wavelength of the monochromatic source.

* * * * *

UNITED STATES PATENT OFFICE
CERTIFICATE OF CORRECTION

Patent No. 3,773,422        Dated November 20, 1973

Inventor(s) Gus Stavis et al

It is certified that error appears in the above-identified patent and that said Letters Patent are hereby corrected as shown below:

Column 3, line 4, "AB/BC = (AB-p)/d" should be

--AB/BC = AB-p/d--

Signed and sealed this 7th day of May 1974.

(SEAL)
Attest:

EDWARD M. FLETCHER, JR.
Attesting Officer

C. MARSHALL DANN
Commissioner of Patents